(12) United States Patent
Kihara et al.

(10) Patent No.: US 6,600,580 B2
(45) Date of Patent: *Jul. 29, 2003

(54) HOLOGRAM PRINT SYSTEM AND HOLOGRAPHIC STEREOGRAM

(75) Inventors: Nobuhiro Kihara, Kanagawa (JP); Takahiro Toyoda, Tokyo (JP); Akira Shirakura, Tokyo (JP)

(73) Assignee: Sony Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/860,517

(22) Filed: May 21, 2001

(65) Prior Publication Data

US 2002/0030863 A1 Mar. 14, 2002

(30) Foreign Application Priority Data

May 29, 2000 (JP) .................................... 2000-159266

(51) Int. Cl.$^7$ ................................................ G03H 1/28
(52) U.S. Cl. ............................ 359/24; 359/22; 359/23; 283/86
(58) Field of Search ..................... 359/22, 23, 24, 359/25, 2, 9, 467, 469, 470, 1, 32, 33, 35; 283/86; 348/40, 41; 396/288

(56) References Cited

U.S. PATENT DOCUMENTS 5,892,602 A    4/1999  Sirat ............................ 359/30
6,292,277 B1    9/2001  Kikinis ......................... 359/9
6,330,088 B1 * 12/2001  Klug et al. .................... 359/10
2002/0015198 A1 * 2/2002  Toyoda et al. ................ 359/23

FOREIGN PATENT DOCUMENTS

JP      06301326 A  * 10/1994  ............ G03H/1/26
JP     2000078451 A  *  3/2000  ............ G03B/15/00

OTHER PUBLICATIONS

"Instant Holographic Portrait Printing System", SPIE, vol. 3293, pp. 246–253, Jan. 1998.

* cited by examiner

Primary Examiner—Thong Nguyen
Assistant Examiner—Arnel C. Lavarias
(74) Attorney, Agent, or Firm—Rader, Fishman & Grauer PLLC; Ronald P. Kananen

(57) ABSTRACT

A single photographic subsystem 2 photographs an original image for a hologram and provides an image information file Fp. In addition, this subsystem provides a management information file Fm for storing management information about the image information file Fp. An image processing section 4 generates a composite image file Fs by applying specified image processing to the image information file Fp and the management information about the management information file Fm provided from the single photographic subsystem 2 via a transmission system 3a. A hologram printer 5 receives the composite image file Fs generated in the image processing section 4 and prints a holographic stereogram based on this composite image file Fs.

2 Claims, 8 Drawing Sheets

| IMAGE DATA IDENTIFICATION ID | PHOTOGRAPHIC INFORMATION | APL INFORMATION | COMPOSITE IMAGE INFORMATION | CHARACTER INFORMATION | PRINT COUNT INFORMATION | RESERVED |
|---|---|---|---|---|---|---|
| 4 | 42 | 33 | 2 | 130 | 2 | 43 |

FIG.3

HOLOGRAM PRINT SYSTEM AND HOLOGRAPHIC STEREOGRAM

BACKGROUND OF THE INVENTION

1. Technical Field

The present invention relates to a hologram print system for printing a holographic stereogram based on image information and to a holographic stereogram printed out from this hologram print system.

2. Prior Art

To create a holographic stereogram, for example, a subject is photographed from different observation points to generate many images as original pictures. These images are sequentially recorded as strip or dot element holograms on a single holographic recording medium.

For example, FIG. 1 illustrates how to create a holographic stereogram having parallax information in a cross direction only. First, a subject 100 is sequentially photographed crosswise from different observation points to generate a parallax image sequence 101 comprising a plurality of images having the crosswise parallax information. Each image 102 constituting the parallax image sequence 101 is sequentially recorded as a strip element hologram on a holographic recording medium 103 so that the images continue crosswise. This provides a holographic stereogram having the crosswise parallax information.

In this holographic stereogram, information about a plurality of images 102 is obtained by sequentially photographing from different observation points along a cross direction and is sequentially recorded crosswise as element holograms in strips. When an observer views this holographic stereogram with both eyes, right and left eyes accept slightly different 2-D images respectively. This causes the observer to feel parallax, reproducing a 3-D image.

Moreover, there have been reported many techniques for displaying 3-D images using holographic stereogram. There has been also reported a printer system and the like for creating holographic stereogram (A. Shirakura; N. Kihara; S. Baba: "Instant holographic portrait printing system", Proc. SPIE Vol. 3293, p. 246–253, Practical Holography XII).

As an application of such a holographic stereogram printing system, it may be preferable to place only photographic systems at various locations. In this case, the photographic system transfers just data to a centrally installed printer for printout.

Whether the photographic apparatus and the printer are available at the same location or different locations, a critical factor in operations is exact correspondence between photographed image data and a printout hologram.

For example, there can be a service for photographing image data at a remote location and mailing a corresponding hologram later on. In this case, it is necessary to send not only customer's image data, but also customer information such as delivery destination. Further, it is desirable to determine correspondence between a printout hologram and a customer.

In many cases, a transparent film is used as a recording material for the hologram printer, making it impossible to place additional information on the rear of the material. As an alternative, it is possible to record information using optical means or ink on a portion which is void of a hologram film image. However, an appropriate function needs to be added to the hologram print system, resulting in an ineffective solution.

BRIEF SUMMARY OF THE INVENTION

The present invention has been made in consideration of the foregoing. It is therefore an object of the present invention to provide a hologram print system for easily managing printout holograms and a holographic stereogram created by this hologram print system.

For solving the above-mentioned problems, a hologram print system according to the present invention for printing a holographic stereogram based on image information comprises information file provision means for providing an image information file to be holographed and a management information file storing management information about the image information file; image processing means for generating a composite image file by overlaying management information according to the management information file on part of a hologram according to the image information file provided from the information file provision means; and printout means for printing a holographic stereogram according to a composite image file generated from the image processing means.

In this hologram print system, the image processing means generates a composite image file by overlaying management information according to the management information file on the image information file in such a manner as to display the management information only within a specified range from a periphery of a vision for the holographic stereogram.

The above-mentioned hologram print system records information in the periphery of the angle of field in a hologram. Namely, the content of a management information file cannot be recognized in most parts of the hologram vision. Image processing is used for compositing the content of an image information file and the content of the management information file so that the content of the management information file is visible in the hologram only when viewed from the extreme periphery.

For solving the above-mentioned problems, a holographic stereogram according to the present invention is printed in a hologram print system based on image information and is characterized by displaying management information about a hologram-oriented image information file stored in a management information file by overlaying on part of a hologram generated according to the image information file.

This holographic stereogram also displays the above-mentioned management information only within a specified range from the periphery of the vision.

The present invention composites an image information file and an associated management information file. This can provide a holographic stereogram which makes the content of the management information file visible only when viewed from an edge of the angle of field. Accordingly, it is possible to easily manage a printout holographic stereogram.

BRIEF DESCRIPTION OF THE SEVERAL VIEWS OF THE DRAWING

FIG. 3 shows a format of a management information file;

DETAILED DESCRIPTION OF THE INVENTION

Figure 1:
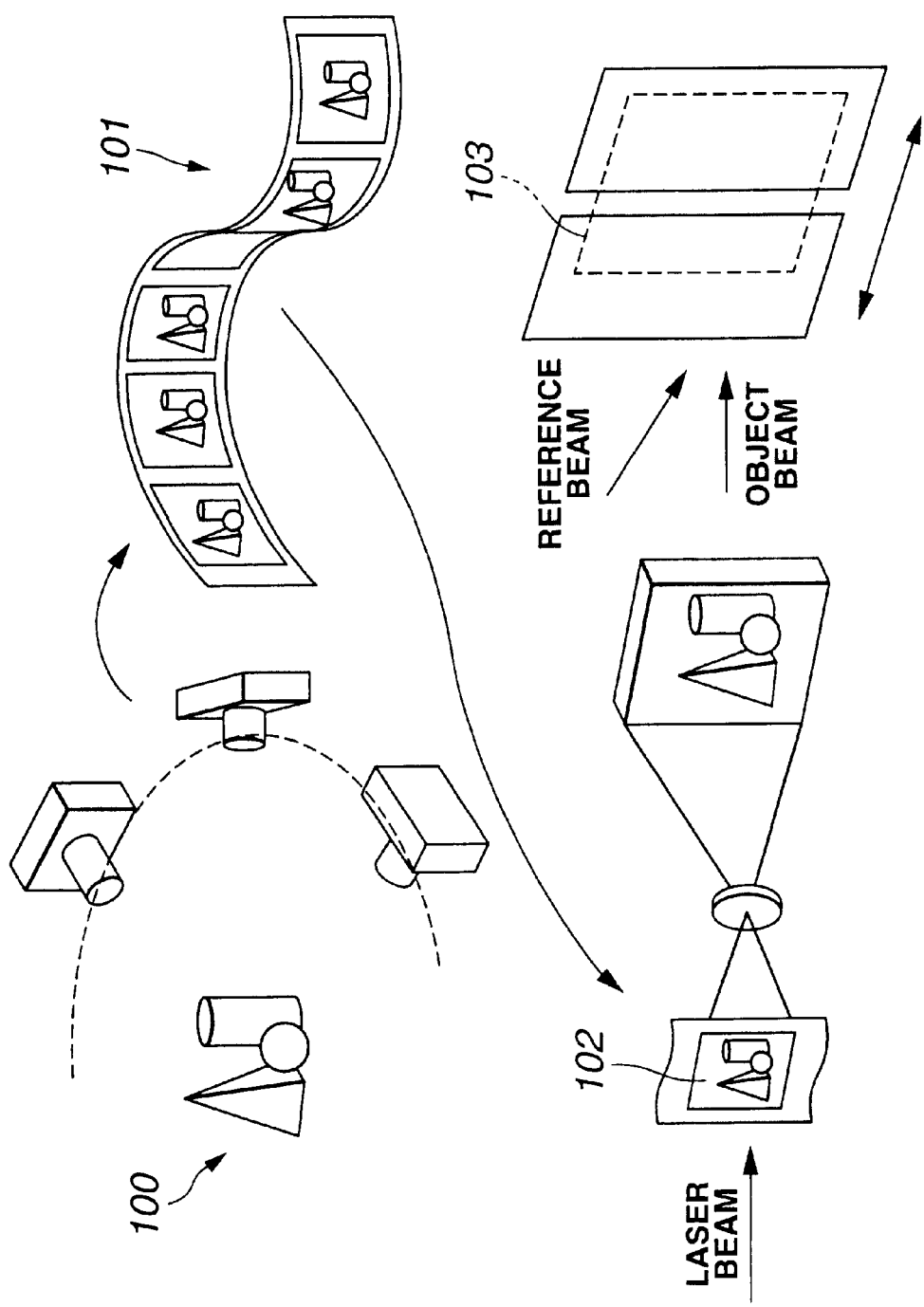
FIG. 1 explains a conventional system for creating a holographic stereogram.

Embodiments of the present invention will be described in further detail with reference to the accompanying drawings. The present invention is not limited to the following examples. It is further understood by those skilled in the art that various changes and modifications may be made in the present invention without departing from the spirit and scope thereof The following describes a hologram print system 1 in FIG. 2. The hologram print system 1 photographs an original image for a hologram and provides an image information file Fp. The system comprises a photographic subsystem 2, an image processing section 4, and a hologram printer 5. The photographic subsystem 2 is a means for providing a management information file Fm which stores management information about the image information file Fp. The image processing section generates a composite image file Fs by applying image processing to the image information file Fp provided from the photographic subsystem 2 via a transmission system 3a and the management information in the management information file Fm. The hologram printer 5 receives the composite image file Fs generated in the image processing section 4 via a transmission path 3b and prints out a holographic stereogram based on this composite image file Fs.

Figure 2:
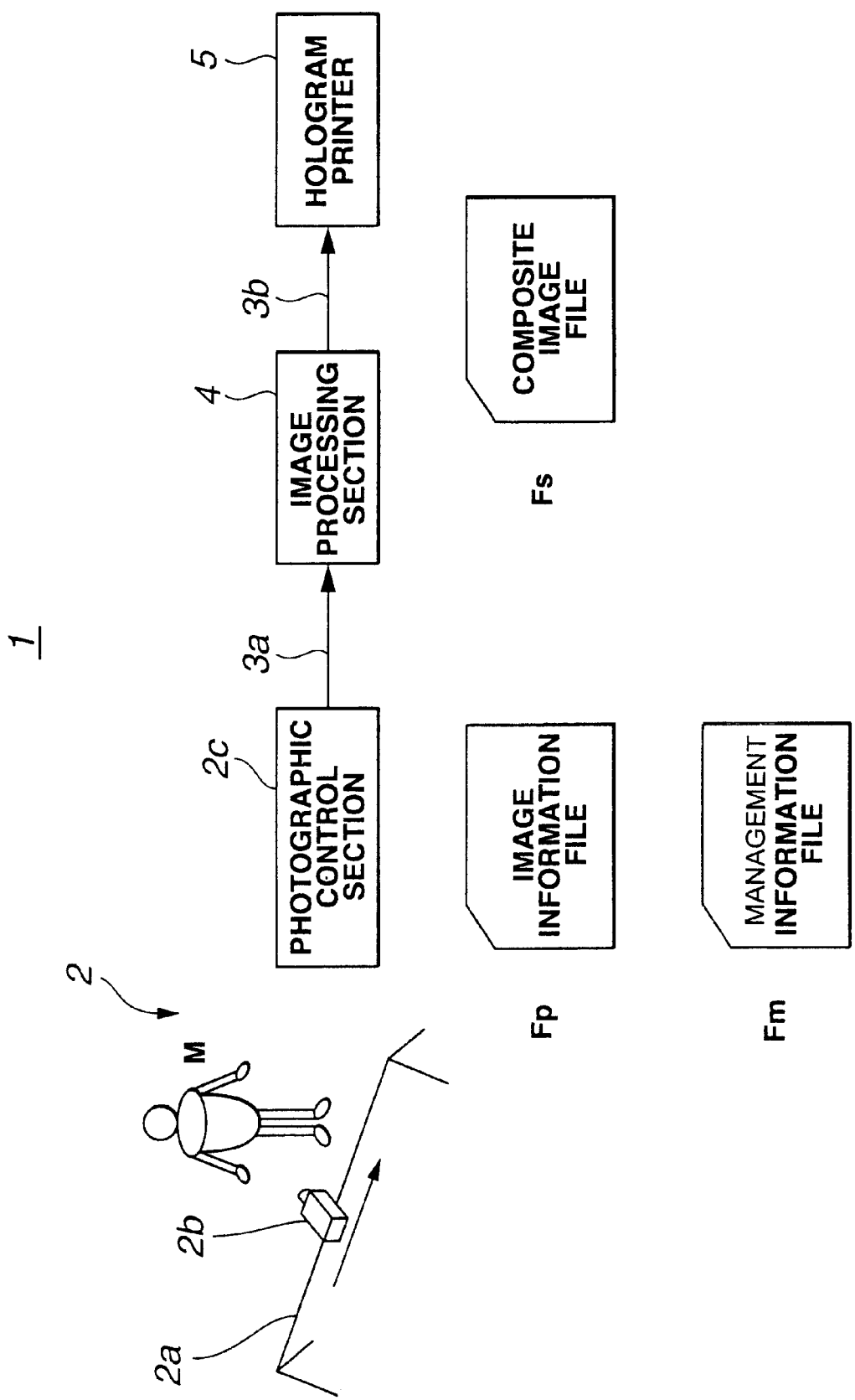
FIG. 2 is a block diagram showing a configuration of a hologram print system according to an embodiment of the present invention.

The photographic subsystem 2 is capable of, say, photographing a subject by using a camera linearly moving on a photography track, alternatively, in a rotational or panning state. In this photographic subsystem 2, as shown in FIG. 2, a camera 2b is directed to a subject M and is fixed along a specified direction. The camera is moved parallel on a photographic track 2a for photographing many frames of the subject M from different positions to produce original images. The photographic subsystem 2 is controlled by a photographic subsystem control section 2c corresponding to a user's operation. An image information file for the original image is provided with the management information file Fm generated in the photographic subsystem control section 2c. The management information file Fm contains various management information about original images. This information chiefly comprises identification numbers and the like. As will be described later in detail, this file stores photographic conditions and information when the photographic subsystem 2 photographs an original image, information about the image information attributes, indexes specified for the photography, and additional information about the image information.

The following describes a detail about the management information file Fm generated with the image information file Fp by the photographic subsystem control section 2c in the photographic subsystem 2. The photographic subsystem control section 2c includes an operation section. This control section controls operations and the like of the camera 2b according to intended selections by the user such as selecting a photographic method, an image size, and a photographic layout. The control section also generates a management information file about the original image based on the control information. The following describes examples of the management information included in this management information file with reference to FIG. 3 and Table 1 to be described later.

The management information comprises an image data identification ID (4 bytes), photographic information (42 bytes), application (APL) information (33 bytes), composite image information (2 bytes), character information (130 bytes), and print count information (2 bytes).

TABLE 1

| Field name | Bytes | Data format |
|---|---|---|
| Image data identification ID | 4 | B |
| Photographic time | 2 | B |
| Photographic distance | 4 | B |
| Photographic method | 1 | B |
| Photographic angle | 2 | B |
| Photographic track length | 4 | B |
| Photographic image size | 8 | B |
| Photographic image resolution | 8 | B |
| Photographic date | 8 | B |
| Photographic layout | 1 | B |
| Photographic source | 2 | B |
| Photographic shutter speed | 2 | B |
| Application ID | 1 | B |
| Application file name | 32 | A |
| Foreground image ID | 1 | B |
| Background image ID | 1 | B |
| Foreground character code ID | 1 | B |
| Foreground character information | 64 | A |
| Background character code ID | 1 | B |
| Background character information | 64 | A |
| Print count | 2 | B |
| Reserved | 43 | B |

The image data identification ID is normally a sequence number used for identifying image data photographed by the camera 2b in the photographic subsystem 2.

The photographic information concerns a condition and the like about the photographic subsystem 2 when the camera 2b photographs the subject M, for example. More specifically, as shown in Table 1 above, the photographic information includes the photographic time, the photographic distance, the photographic method, the photographic angle, the photographic track length, the photographic image size, the photographic image resolution, the photographic date, the photographic layout, the photographic source, and the photographic shutter speed. The photographic time uses 2 bytes: the first byte for a 2-digit integer part and the second byte for a 2-digit fractional part. For example, 0725 h means 7.25 seconds of the photographic time. The photographic distance is represented by a 4-byte integer (mm). The photographic method distinguishes among recentering, rotational, panning, and straight-track states for photographing through the use of the camera 2b . The photographic angle is a 2-byte integer indicating an angle of the camera 2b against the subject M. The photographic track length is a 4-byte integer. The photographic image size uses eight bytes: the four high-order bytes indicating a horizontal size (mm) of a photographic region and the four low-order bytes indicating a vertical size (mm) thereof. The photographic image resolution uses eight bytes: the four high-order bytes indicating a horizontal resolution (pixels) and the four low-order bytes indicating a vertical resolution (pixels). The photographic date uses eight bytes, including a 1-byte dummy, to indicate a year, a month, a day, an hour, a minute, and a second. The photographic layout uses one byte to indicate a vertical or horizontal rotation angle. The 2-byte photographic source uses the one high-order byte to indicate a manufacturer ID and the one low-order byte to indicate a model ID of the camera 2b. The photographic shutter speed is assigned two bytes.

The application information comprises the application ID and the application file name. The user uses the operation section of the photographic subsystem control section 2c to specify types of images printed on a holographic stereogram. The photographic subsystem control section 2c determines whether the user specifies 3-D printing, motion picture printing, still picture album printing, or special-effect printing such as morphing. The application software for the corresponding image processing is selected from a software storage section and is read into RAM for execution. The 1-byte application ID is appended to the selected application. The application file name is expressed with up to 32 ASCII-code characters. The application file name indicates the name of a file which stores information needed for printing corresponding to the application specified by the application ID. In the case of still picture printing, for example, the file specified with the application file name specifies the number of still pictures to be printed and file names for respective still pictures.

The composite image information is associated with an image to be composited with an original image photographed by the photographic subsystem 2. The one byte indicates an image number to be composited to the foreground or background of the original image data.

The character information comprises the foreground character code ID, the background character code ID, the foreground character information, and the background character information. One byte is assigned to each of the foreground character code ID and the background character code ID. The two low-order bits specify a character code such as ASCII, SJIS, Unicode, and the like. The six high-order bits specify 64 font types. The foreground character information and the background character information each use 64 bytes to express character information identified by the character code ID and use a Null character as a terminator.

The print count information uses two bytes to indicate the number of holographic stereograms to be printed on the hologram printer 5.

The transmission path 3a transmits the image information file Fp and the management information file Fm from the photographic subsystem 2 to the image processing section 4. The transmission path 3b transmits the composite image file Fs generated in the image processing section 4 to the hologram printer 5.

The image processing section 4 composites the image information file Fp and the management information file Fm. The section then applies necessary image processing such as the viewpoint conversion and the Keystone distortion collection to output the composite image file Fs.

Generally, image processing called the slice and dice method is applied to a holographic stereogram for correcting display positions of a 3-D image. The slice and dice method is detailed in "Instant holographic portrait printing system" (A. Shirakura; N. Kihara; S. Baba: Proc. SPIE Vol. 3293, p. 246–253, practical Holography XII). It is possible to composite the image information file Fp and the management information file Fm before or after the slice and dice image processing. The following describes the composition before the slice and dice image processing. The image composition method performed in the image processing section 4 is described with reference to FIGS. 4A and 4D. It is assumed that the subject M is photographed by moving a camera C from the left (L) to the right (R) between f1 and f150, say, for five seconds as shown in FIG. 4(a). In this case, the parallax images are recorded as frames fr1 to fr150 from the right to the left of the subject M in the image information file Fp as shown in FIG. 4(b).

Figure 4:
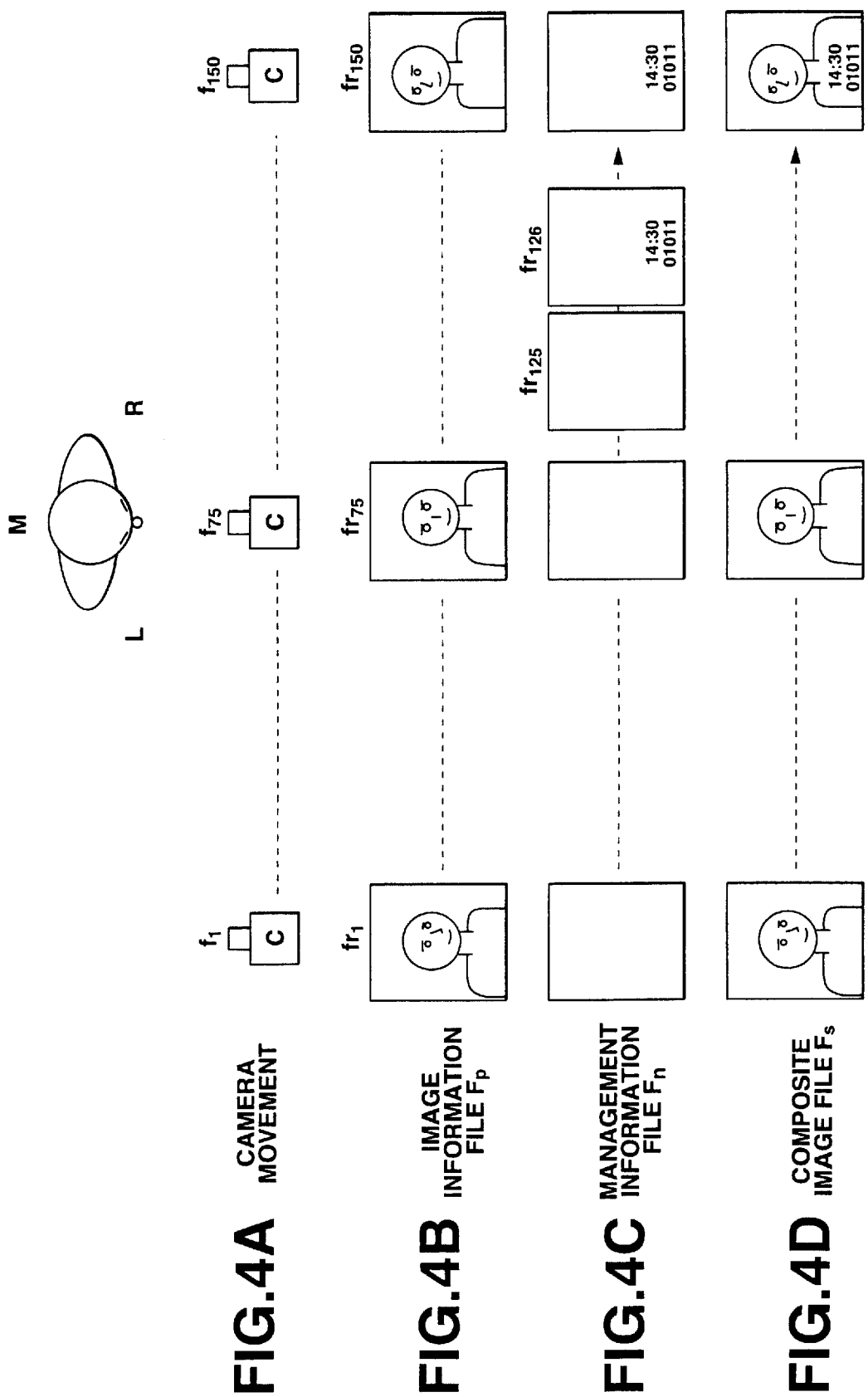
FIGS. 4A–4D illustrate a method of compositing images in an image processing section constituting the above-mentioned hologram print system.

As shown in FIG. 4(c), management information generated from the management information file Fm is composited to the latter half of the image information file Fp, namely 25 frames from fr126 to fr150, for the thus recorded subject M. The example in FIG. 4 shows compositing the photographic time "14:30" and the sequence number "01011". Composition of the image information file Fp and the management information file Fm follows a widely known method such as the chroma key composition which uses a blue background for the management information in the management information file Fm. The composited result is provided as the composite information file Fs.

The slice and dice image processing is applied to the composited composite image file Fs (FIG. 4(d)) as an original image. The processed file is passed to the hologram printer 5 via the transmission pain 3b. The hologram printer 5 records the thus processed composite image file Fs on a holographic recording medium as will be described later to generate a holographic stereogram. 0

The example in FIGS. 4A–4D provide a holographic stereogram which allows observation of the management information generated from the management information file Fm only when viewed from a specific angle at the right end of the angle of field.

Figure 5:
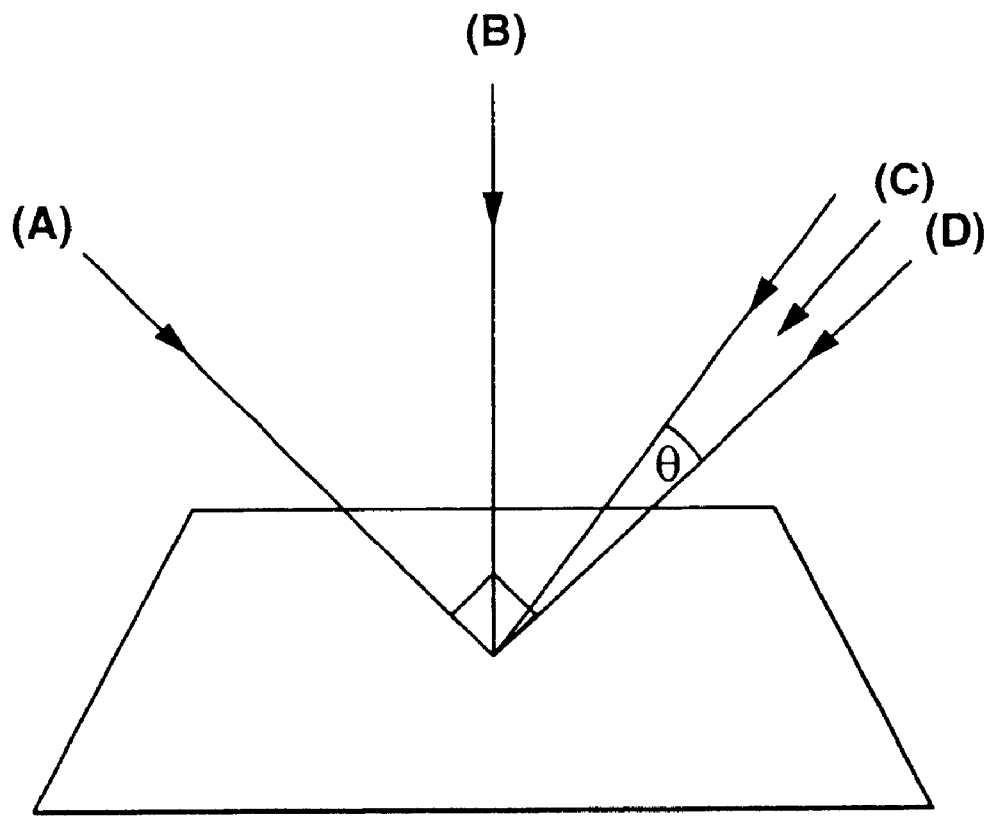
FIG. 5 shows the relationship between an angle of field for a holographic stereogram generated in the above-mentioned hologram print system and a visible range of management information.
Figure 6A:
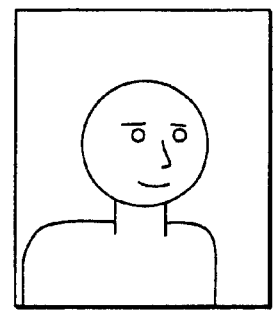
FIG. 6A–6D show visible states of a holographic stereogram viewed from directions (A), (B), (C), and (D) in FIG. 5.
Figure 6B:
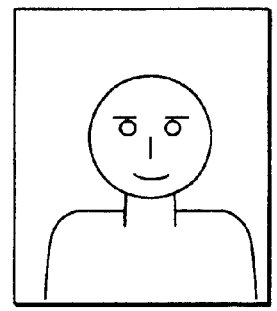
Figure 6C:
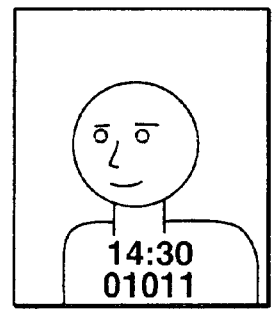
Figure 6D:
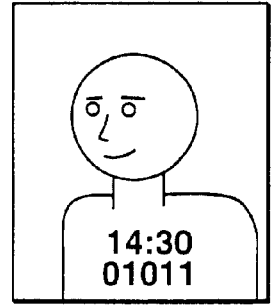

As shown in FIG. 5, it is assumed that the angle of field is 90 degrees between directions (A) and (D) when viewed from the horizontal direction of the holographic stereogram. It is possible to determine a viewable range of the management information generated from the management information file Fm so that observation of the image information file Fp is not hindered and an image generated from the information file is visible only when needed. For example, this range can be determined within 15 degrees (θ) from the direction (D) at the right end of the angle of field. This angle, 15 degrees, is equivalent to 25 frames since 150 frames correspond to 90 degrees of the angle of field for five seconds of photographing. The management information is visible when viewed from the direction (C) within 15 degrees (θ) from the direction (D) at the right end of the angle of field.

FIGS. 6A–6D show visible states of a holographic stereogram viewed from directions (A), (B), (C), and (D) in FIG. 5. The direction (A) shows only the left side of the subject M. The direction (B) shows only the front of the subject M. The direction (C) within the angle q shows the subject N and the management information such as the photographic time "14:30" and the sequence number "01011" in this case. The direction (D) corresponding to 90 degrees of the angle of field also shows the subject N and this management information.

Figures 7A, 7B:
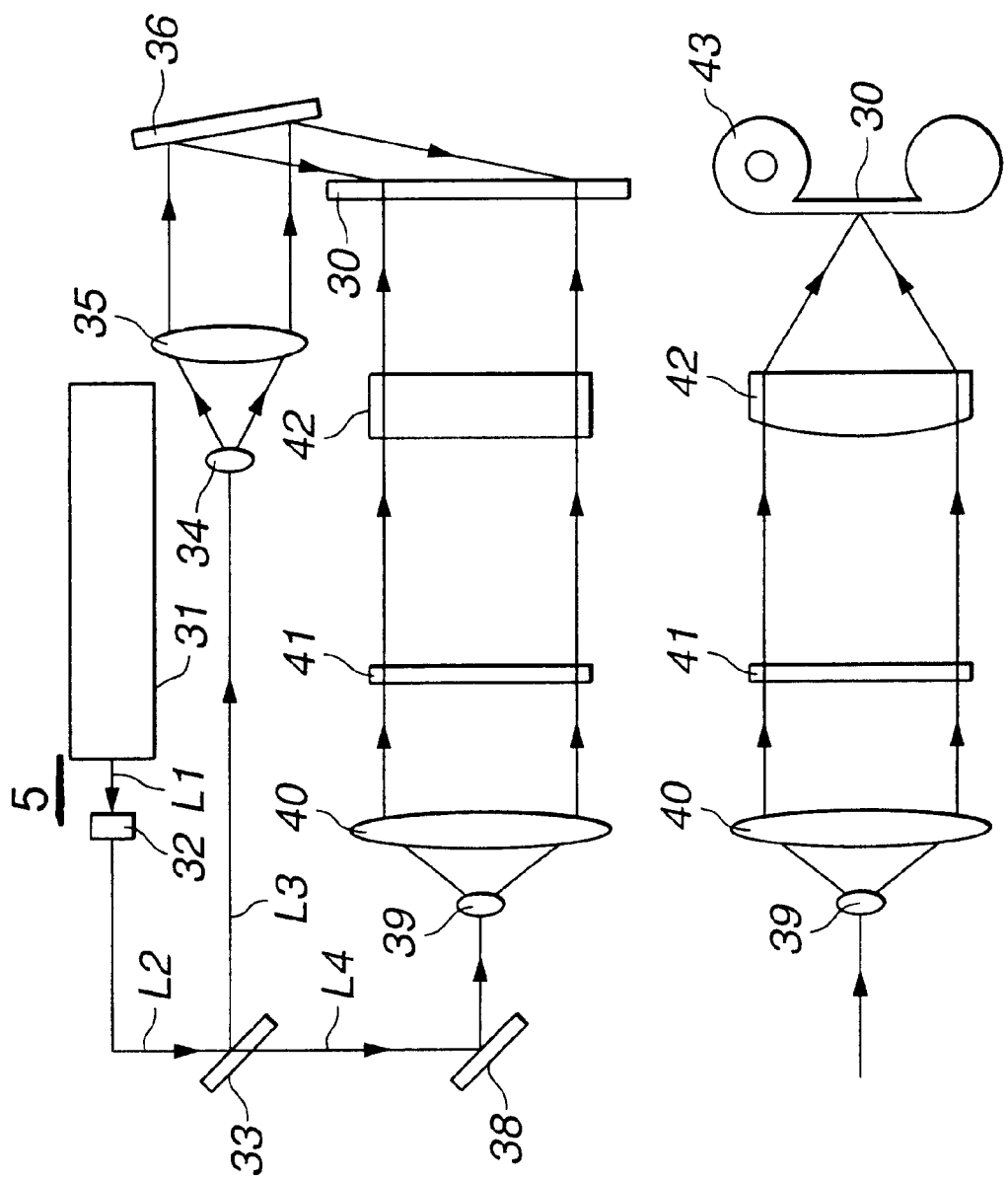
FIGS. 7A and 7B show a configuration of a hologram printer.

The hologram printer 5, as shown in FIG. 2, is described in detail with reference to FIGS. 7A and 7B. FIG. 7 (A) is a top view of an entire optical system for the hologram printer 5. FIG. 7 (B) is a side view of part of this optical system.

As shown in FIG. 7 (A), the hologram printer 5 comprises a laser beam source 31, an exposure shutter 32, and a half mirror 33. The laser beam source 31 irradiates a laser beam with a specified wavelength. The exposure shutter 32 is arranged on an optical axis of a laser beam L1 from the laser beam source 31.

The exposure shutter 32 is closed when a holographic recording medium 30 is not exposed. This shutter is opened when the holographic recording medium 30 is exposed. The half mirror 33 separates a laser beam L2 passing through the exposure shutter 32 into a reference beam and an object beam. Light L3 reflected on the half mirror 33 becomes the reference beam. Light L4 passing through the half mirror 33 becomes the object beam.

As an optical system for the reference beam, there are arranged a cylindrical lens 34, a collimator lens 35, and a total reflection mirror 36 in this order along an optical axis for the light L3 reflected on the half mirror 33. The collimator lens 35 converts the reference beam into a parallel beam. The total reflection mirror 36 reflects the parallel beam from the collimator lens 35.

The light reflected on the half mirror 33 first passes through the cylindrical lens 34 to become divergent light and then passes through the collimator lens 35 to become parallel light. The parallel light is then reflected on the total reflection mirror 36 and enters the holographic recording medium 30.

As an optical system for the object beam, there are arranged a total reflection mirror 38, a spatial filter 39, a collimator lens 40, a display apparatus 41, and a cylindrical lens 42 in this order along an optical axis for the light L4 passing through the half mirror 33 as shown in FIGS. 7 (A) and 7 (B). The total reflection mirror 38 reflects transmitted light from the half mirror 33. The spatial filter 39 comprises a combination of a convex lens and a pinhole. The collimator lens 40 converts the object beam into a parallel beam. The display apparatus 41 displays an image to be recorded. The cylindrical lens 42 converges the object beam onto the holographic recording medium 30.

The light L4 passing through the half mirror 33 is reflected on the total reflection mirror 38 and then passes through the spatial filter 39 to become diffuse light from a point light source. The light L4 passes through the collimator lens 40 to become parallel light and then enters the display apparatus 41. The display apparatus 41 is a transmission-type image display apparatus using, say, a liquid crystal panel for displaying an image based on the image data transmitted from the photographic subsystem 2. After passing through the display apparatus 41, the light is modulated according to an image displayed on the display apparatus 41 and then enters the cylindrical lens 42.

The cylindrical lens 42 horizontally converges the light passing through the display apparatus 41. This converged light works as the object beam and enters the holographic recording medium 30. Namely, the projected light from the display apparatus 4 is transformed into a strip-shaped object beam and enters the holographic recording medium 30.

Here, the reference beam enters one principal plane of the holographic recording medium 30. The object beam enters the other principal plane thereof. Namely, the reference bean enters one principal plane of the holographic recording medium 30 at a specified incident angle. The object beam enters the other principal plane thereof so that the optical axis becomes almost perpendicular to the holographic recording medium 30. This causes an interference between the reference beam and the object beam on the holographic recording medium 30. The interference generates an interference pattern which is recorded as a refractive index change on the holographic recording medium 30.

The hologram printer 5 is provided with a recording medium feed mechanism 43 which can incrementally feed the holographic recording medium 30. The holographic recording medium 30 is mounted on the recording medium feed mechanism 43 with a specified state. The recording medium feed mechanism 43 incrementally feeds the mounted holographic recording medium for one element hologram each time one image is recorded as one element image based on the original image data. This operation sequentially records images based on the original image data as element images on the holographic recording medium 30 so that the images continue in the horizontal direction.

The hologram printer 5 uses the display apparatus 41 to display an exposure image based on the image data. The holographic recording medium 30 is exposed by opening the exposure shutter 32 for a specified time.

At this time, the laser beam L2 is irradiated from the laser beam source 31 and passes through the exposure shutter 32. This laser beam is reflected on the half mirror 33 to become the light L3 and enters the holographic recording medium 30 as the reference beam. The laser beam passes through the half mirror 33 to become the light L4. This is projected light where the image displayed on the display apparatus 41 is projected. The projected light enters the holographic recording medium 30 as the object beam. This records the exposure image displayed on the display apparatus 41 as a strip-shaped element image onto the holographic recording medium 30.

When one image has been recorded on the holographic recording medium 30, the recording medium feed mechanism 43 feeds the holographic recording medium 30 for one element hologram.

The above-mentioned operations are repeated by sequentially changing exposure images to be displayed on the display apparatus 41 according to the parallax image sequence. Consequently, exposure images based on the original image data are sequentially recorded as strip-shaped element images on the holographic recording medium 30.

Via the transmission path 3b, the hologram printer 5 receives the composite image file Fs which is composited in the image processing section 4 and is processed with the specified image processing. The hologram printer prints out a holographic stereogram in such a manner as to overlap the management information based on the management information file Fm with part of the hologram based oil the image information file Fp.

Accordingly, it is possible to provide reliable correspondence between the printed holographic stereogram and the photographed image data, making the management easy.

In the above-mentioned embodiment, the management information is visible only when viewed from the light end. It may be preferable to let the management information be visible only when viewed from the left end. In this case, the management information can be provided by compositing 25 frames from fr1 to fr25 in FIG. 4 with the image information file.

The above-mentioned embodiment describes the case where the management information file is provided as still pictures. It is also possible to vary some of the information depending on angles. In this case, different management information is composited with the image information file every five frames. In FIGS. 4A–4D, for example, five frames from the frame 126 record the photographic time and the sequence number. Five frames from the frame 130 record the number of the photographic apparatus used for photographing and the number of prints. Five frames from the frame 135 record the photographic distance and method. Five frames from the frame 140 record the photographic shutter speed or the like.

In the above-mentioned embodiment, the image processing section 4 composites the image information file Fp and the management information file Fm before the slice and dice image processing. It may be preferable to independently composite the image information file Fp and the management information file Fm after the slice and dice image processing.

The management information file does not necessarily need to be generated in the computer such as the photographic subsystem control section 2c. It may be preferable to use text or other data recorded on a voice track of video tape recording the image information file. It may be also preferable to use a time code in video tape as a management information file attached to the image.

Figure 8:
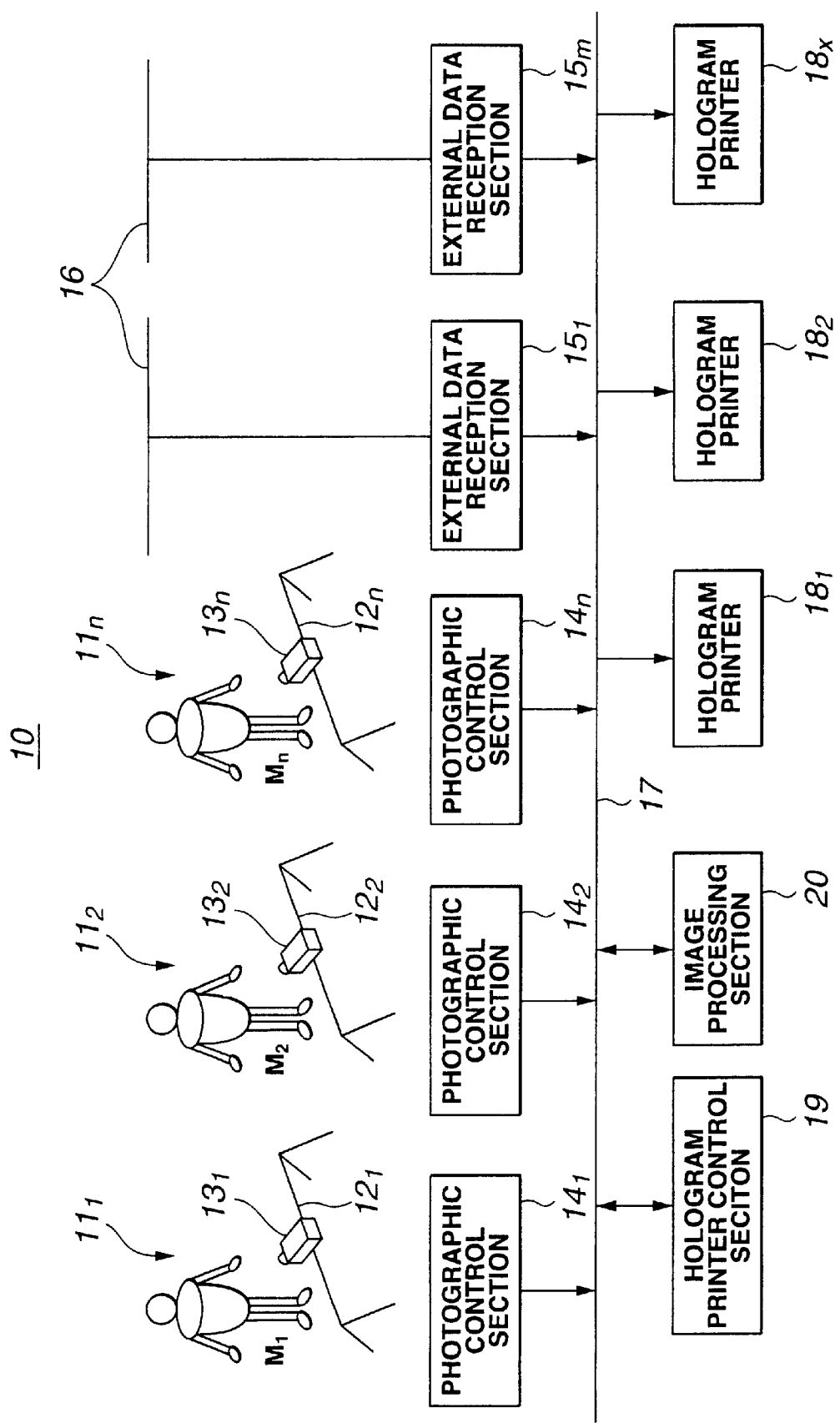
FIG. 8 is a block diagram showing a configuration of a hologram print system according to another embodiment of the present invention.

Another embodiment of the present invention is described with reference to FIG. 8. According to this embodiment, the hologram print system uses a plurality of photographic subsystems and external data acceptance sections to acquire images. The system uses a plurality of hologram printers via a network to store these images for holographic stereogram printout.

A hologram print system 10 comprises n photographic subsystems $11_1$ to $11_n$, m external data acceptance sections $15_1$ to $15_m$, x hologram printers $18_1$ to $18_x$, a hologram printer control section 19, and an image processing section 20. They are all connected to a network 17.

Of n photographic subsystems $11_1$ to $11_n$, say, the photographic subsystem $11_1$ is equivalent to the photographic subsystem 2 in FIG. 2. Namely, this configuration is capable of photographing a subject $M_1$ by using a camera $13_1$ moving on a photographic track $12_1$ or by using the rotational or panning method. This photographic subsystem $11_1$ is controlled by a photographic subsystem control section $14_1$ according to user operations. An original image is provided with a management information file generated in photographic subsystem control section $14_1$.

Photographic subsystems $11_2$ to $11_n$, depicted in FIG. 2, operate in a manner consistent with photographic subsystem $11_1$. In particular, subjects $M_2$ to $M_n$, cameras $13_2$ to $13_n$, and photographic tracks $12_2$ to $12_n$, of photographic subsystems $11_2$ to $11_n$, respectively, function in manner equivalent to subject $M_1$, camera $13_1$, and photographic track $12_1$ of photographic subsystem $11_1$ discussed above.

Each of the photographic subsystem control sections $14_1$ to $14_n$ generates a management information file according to FIG. 3 and Table 1. The description thereof is omitted here.

The external data acceptance section $15_1$ captures a movie or a plurality of still pictures directly from a digital still camera, a digital video camera, an analog video apparatus, and the like via various external networks 16 and the like.

The external data acceptance section $15_m$ captures a movie or a plurality of still pictures from various removable media such as an FD, CD-ROM, DVD, semiconductor memory card, and the like via various external networks 16 and the like.

Of x hologram printers $18_1$ to $18_x$, say, the hologram printer $18_1$ has the same configuration as shown in FIGS. 7A and 7B. The description thereof is omitted here.

The hologram printer control section 19 controls operations of x hologram printers $18_1$ to $18_x$. The image processing section 20 applies specified image processing to various data from the photographic subsystems and external data acceptance sections. The hologram printer control section 19 and the image processing section 20 comprise server computers.

The following describes operations of the hologram print system 10. When there are provided n photo graphic subsystems and m external data acceptance sections, it is assumed that one photographic subsystem captures an image. This photographic subsystem exchanges signals with the server computer. When the image processing section 20 in the server computer becomes ready to accept images, the photographic subsystem transfers the captured image to the server computer's image processing section 20. At this time, the photographic subsystem's photographic subsystem control section creates the management information file and sends it to the server computer along with an image information file. The management information file is used for adding photographic apparatus numbers and sequence numbers for identifying a plurality of input systems as well as the above-mentioned information to the information needed for identifying images.

The contents of the management information file may be fully dependent on the photographic subsystem or the external data acceptance section. This file can include identification numbers specified by the server computer.

When receiving the image, the server computer's image processing section 20 composites the image information file Fp and the management information file Fm like the image processing section 4 in FIG. 2. The image processing section 20 then outputs the composite image file Fs by performing specified image processing called the slice and dice method such as the viewpoint conversion and the Keystone distortion correction.

The server computer's hologram printer control section 19 searches x hologram printers for a hologram printer ready for printing and sends the composite image file Fs to this printer. Obviously, it is possible to flexibly determine which printers to be used for the transferred image by changing the server computer settings.

The hologram printer specified by the server computer's hologram printer control section 19 prints a holographic stereogram based on the transferred composite image file Fs.

Especially, merging the management information file with the image information file is effective for a system comprising a plurality of photographic subsystems, printers, and the like.

Also in the hologram print system 10 of this embodiment, as mentioned above, it may be preferable to design the management information to be visible only when viewed from the left end as well as only when viewed from the right end.

The above-mentioned embodiment describes the case where the management information file is provided as still pictures. It is also possible to vary some of information depending on angles.

In the above-mentioned example, the image processing section 20 composites the image information file Fp and the management information file Fm before the slice and dice image processing. It may be preferable to independently composite the image information file Fp and the management information file Fm after the slice and dice image processing.

The management information file does not necessarily need to be generated in the computer such as the photographic subsystem control section. It may be preferable to use text or other data recorded on a voice track of video tape recording the image information file. It may be also preferable to use a time code in video tape as a management information file attached to the image.

What is claimed is:

1. A hologram print system for printing a holographic stereogram based on image information, comprising:

information file provision means for providing an image information file to be holographed and a management information file for storing management information about the image information file;

image processing means for generating a composite image file by overlaying management information according to said management information file on part of a hologram according to said image information file provided from said information file provision means; and printout means for printing a holographic stereogram according to a composite image file generated from said image processing means, wherein said image processing means generates a composite image file in such that said management information is only within a specified range from a periphery of a field of view for said holographic stereogram, and wherein said specified range is an angle within 15 degrees of the periphery of the field of view.

2. A holographic stereogram printed in a hologram print system based on image information, wherein management information about a hologram-oriented image information filed stored in a management information file is displayed overlaying said management information on part of hologram generating according to said image information file, wherein said management information displayed when a viewing angle is within a specified range from a periphery of a field view for said holographic stereogram, and wherein said specified range is an angle within 15 degrees of the periphery of the field of view.

* * * * *